INVENTOR
WILLIAM H. VanBENSCHOTEN
BY
Semmes, Keegin, Robinson+Semmes
ATTORNEYS

Nov. 30, 1954  W. H. VAN BENSCHOTEN  2,695,469
DISPLAY DEVICE

Filed June 30, 1950  4 Sheets-Sheet 2

INVENTOR
WILLIAM H. VAN BENSCHOTEN

BY
ATTORNEYS

Nov. 30, 1954  W. H. VAN BENSCHOTEN  2,695,469
DISPLAY DEVICE
Filed June 30, 1950  4 Sheets-Sheet 3

INVENTOR
WILLIAM H. VAN BENSCHOTEN
BY
Semmes, Keegin, Robinson & Semmes
ATTORNEYS Nov. 30, 1954  W. H. VAN BENSCHOTEN  2,695,469
DISPLAY DEVICE
Filed June 30, 1950  4 Sheets-Sheet 4
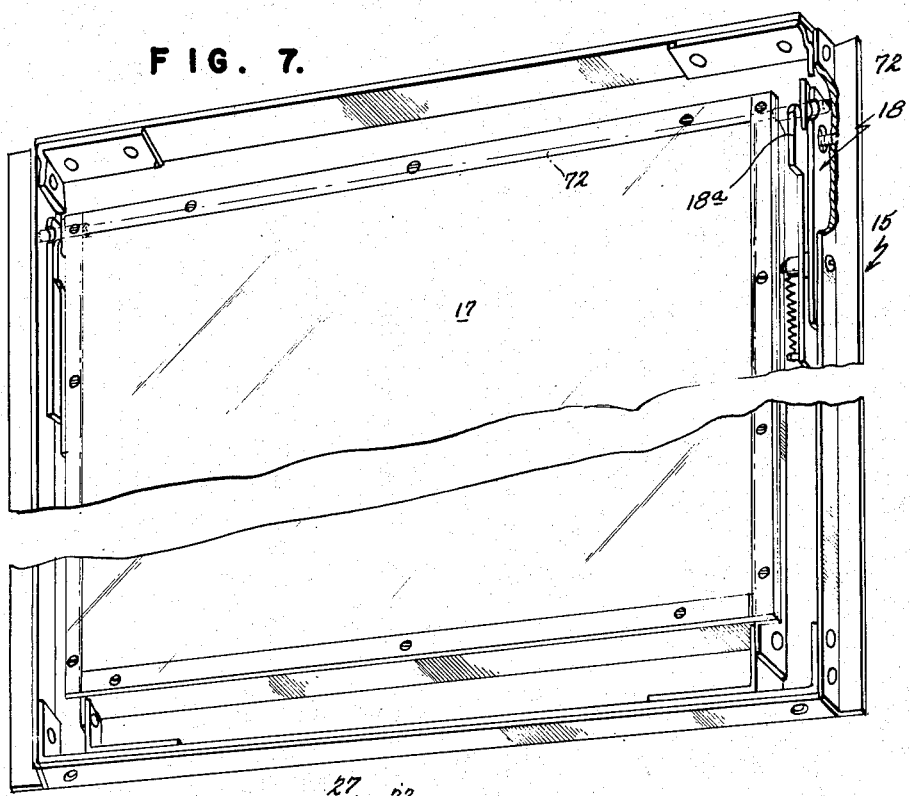
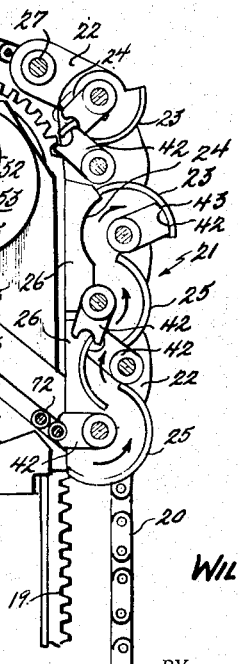
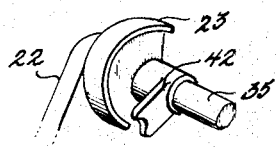
INVENTOR
WILLIAM H. VAN BENSCHOTEN
BY
Semmes, Keegin, Robinson & Semmes
ATTORNEYS

United States Patent Office 2,695,469
Patented Nov. 30, 1954

2,695,469

DISPLAY DEVICE

William Henry Van Benschoten, West Park, N. Y.

Application June 30, 1950, Serial No. 171,259

5 Claims. (Cl. 40—96)

The present invention relates to display devices and has particular reference to means for mechanically displaying a plurality of indicia bearing panels simultaneously and concurrently to create the illusion of wiping or unfolding one panel into another.

Those familiar with the art recognize the deficiencies of operation and of manufacture of devices which have been previously constructed to successively display panels, to create the illusion of panels carrying varying types of indicia merging one into the other. For the most part, the structures previously commercialized and patented are complicated, cumbersome and inefficient in operation, the complexity of detail and moving parts causing breakdown. Previously the art has required employing such panels as may be mounted upon rollers. Expensive instruments are normally used for moving the rollers from rolled to an unrolled position. Oscillating carriage means are often adapted to position and gather a number of panel rolls at the same time. Other devices of a like nature employ the principle of gathering and paying out increments of webs from one portion of a device to another adopting complicated carriage structures actuable through endless linkage connection with an actuating motor. The present invention has been conceived with the purpose in mind of overcoming the foregoing deficiencies of construction and operation which often result in extensive maintenance and reconstruction.

An object of the invention is to provide a simple and inexpensive device for displaying indicia bearing panels concurrently, to produce the effect of elision.

Yet another object of the invention is to provide means for displaying readily interchangeable delicate indicia bearing panels of a flexible type wherein the panels are given the appearance of moving, eliding and unfolding one into the other.

Still another object of the invention is to provide a display device having a unitary carriage element movably mounted therein for gathering and depositing indicia bearing panels from a point of rest and for moving the said panels continuously from points of gathering to points of deposit to display the same concurrently to create the illusion of the continuous folding of one panel into another.

Yet another object of the invention is to provide registry means on a display device such as will enable the registry of at least more than one panel for purposes of displaying such panels concurrently and wherein such registry means are cooperably associated with means for alternately gathering, depositing and holding the panels during operation.

The machine is specifically adapted to display panels which may be constructed of the very least expensive type of materials such as papers, thin and even porous cloths and the like. The operation of the instrument is so gentle that little or no wear is inflicted upon the panels notwithstanding continuous usage over long periods of time. Broadly, the invention comprises a housing suitable for containing a plurality of panels in suspended readiness for display purposes. Panel carriage means are mounted upon endless belts rotatable within the housing. The carriage means is adapted to transfer panels from a position of readiness to points of registry and to display the panels in a manner resembling the unfolding of said panels one into another.

To facilitate comprehension of the invention, reference is made to the drawings and ensuing description.

In the drawings:

Figure 6 is an expanded view of a portion of the carriage;

Figure 7 is a view in perspective of the inner frame structure;

Figure 9 is a diagrammatic view of the carriage structure in an advanced phase of operation.

Figure 1:
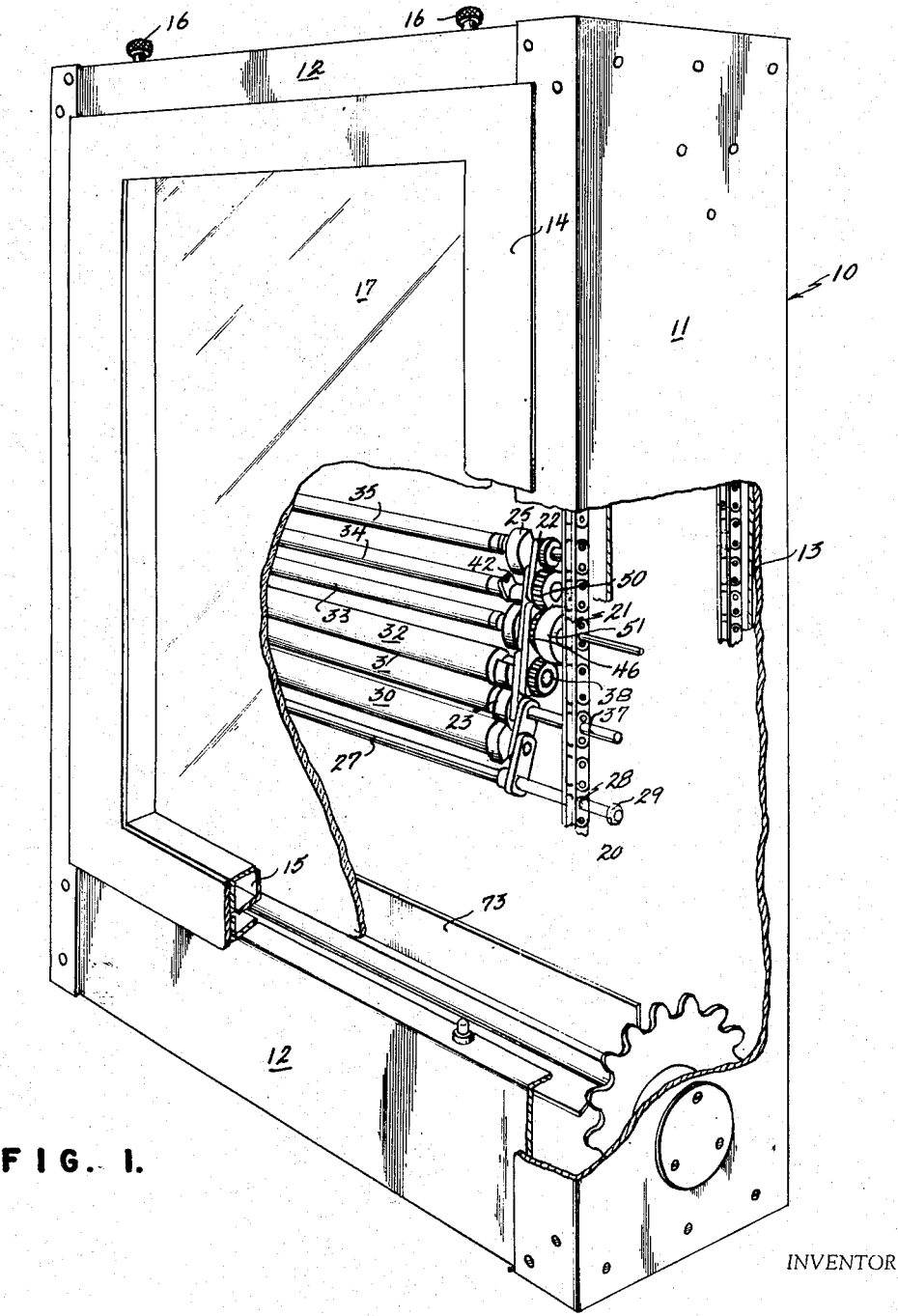
Figure 1 is a view in perspective of the invention, a portion thereof being in fragment revealing the carriage mechanism.

The invention comprises a housing 10 being formed of longitudinal frame walls 11 and horizontally supporting partitions 12, as shown in Figure 1. Two parallel passageways 13 are provided on inner surfaces of each wall 11 to form a guide for roller extensions of a carriage element. Such passageways are shown in phantom detail in Figure 1. For purposes of providing a covering frame to the device, an outer frame 14 may be secured to an inner frame 15.

Inner frame 15 is designed for engagement with the rectangular frame portion of the housing, the exterior of inner frame 15 being relatively flush with respect to the exterior front surfaces of the housing. Thus the frame 15 may be secured by detents 16 to the housing. The inner frame 15 is provided with a transparent screen 17 through which are shown panels which may be displayed in predetermined sequence.

Upon an upper portion of the frame 15 and secured in vertically slidable relation thereto, there are provided cut-out hangers 18 which are adapted to alternately receive panel rods in spring engagement. See Figure 7. Seating plates 18a are slidably seated within the frame, each plate being vertically movable with respect to the sides of the frame. Plates 18a are retractably mounted upon the frame so that corresponding rod engaging portions of hangers 18 and plates 18a may cooperably seat a panel rod for registry on the frame. Positioning of a rod 72 upon this hanger element facilitates the placement of a panel contiguous the inner surface of the transparent screen of the frame and enables the unfolding of such a frame against the inner surface of the window.

Figure 5:
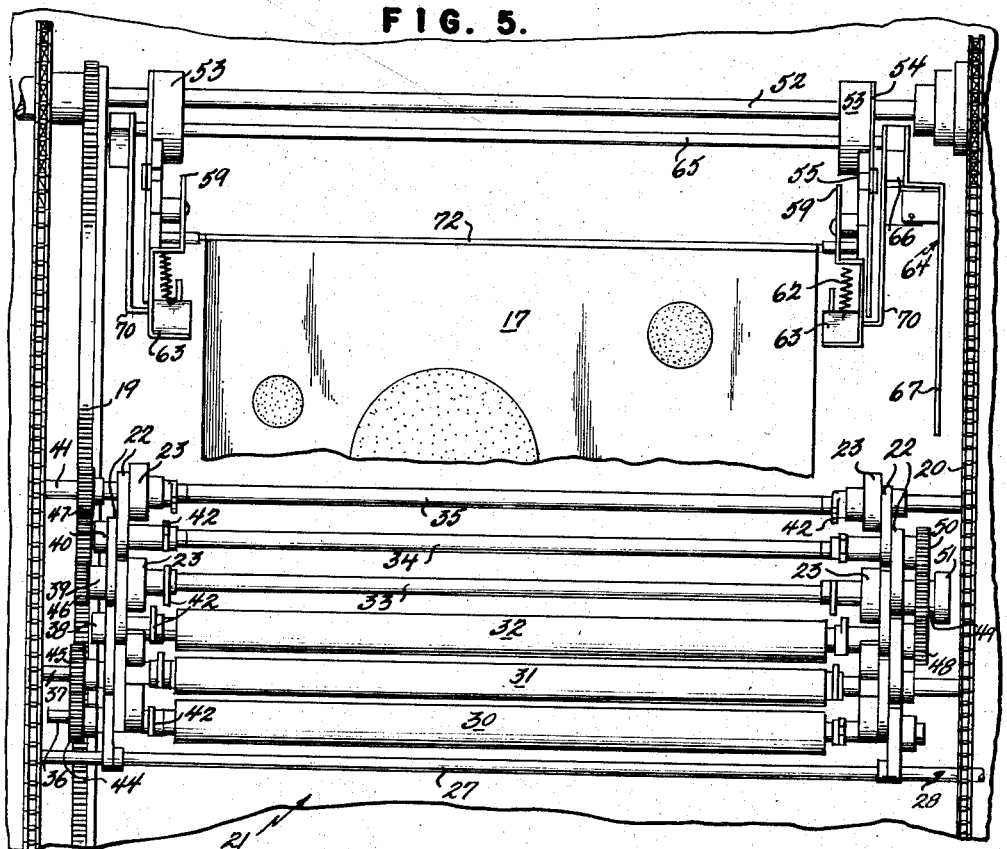
Figure 5 is a fragmentary side elevational view of the carriage structure and related elements.
Figure 8:
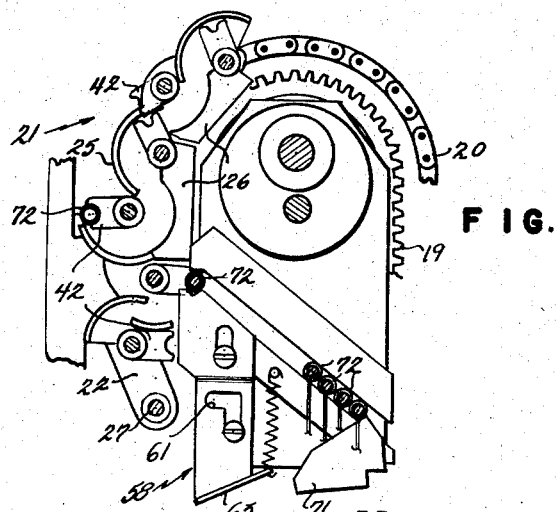
Figure 8 is a diagrammatic view of the carriage structure in one phase of operation.

As in Figures 5 and 9, a gear rack 19 is shown on the left side of the housing and is held in spaced relation to the left wall of the housing through engagement with bushings of a drive and idler shaft where such shafts bear in walls of the housing. China 20 is placed in concentric relation with respect to the rack 19 and is movable about sprockets which are seated in bushing engagement with walls of the housing. These chains 20 conform in line of travel to the direction of the guides emplaced in the walls 11 of the device. Movement to the chains may be effected as through actuation of a suitable motor mounted on a side wall and in drive engagement with an axle and sprockets mounted across the base of the housing.

Referring to Figures 1, 5 and 9, a carriage 21 secures a plurality of roller elements engageable with the chain and having gear portions thereon engageable with the rack disposed on the left portion of the device. Carriage 21 includes linkage elements 22 which are six in number, each of which is linked to the other in bearing relation. In the following description of the linkage portion defining the carriage, the opposed links and connecting portions on one side of the device are substantially similar to those which appear on the opposite side of the device. Thus where the trailing links 22 have arcuate guides 23, the exterior portions of which are visible in Figure 1 and shown in detail in Figure 9, similar guides appear on the opposite side of the carriage which extends laterally across the housing. Guides 23 may be secured to the links 22 through expanded key engagement therewith. Guides 24 are secured on links 22 in a manner enabling transfer of panel rods from one trailing roller to another. Referring to the trailing portion of the carriage, there are opposed arcuate guides 25, each of which is provided with a flat surface 26 on an exterior portion. Surfaces 26 form a race for the carriage as it is passed over the holding element adapted to secure the panels in a state of readiness.

A leading roller guide 27 bears in the leading links 22 of the carriage and has extensions 28 which likewise bear in the chains, which extensions protrude beyond the chains and bear rollers 29 for rotatable engagement with the guide portions of the walls 11 of the housing. A frame roller 30 is shown to bear in the overlapping portion of the first leading linkage element and second leading linkage element. This frame roller 30 is shown to be displaced relatively outwardly with respect to the leading roller guide 27. A center roller 31 is secured between the second and third links of the linkage element reading from the leading edge thereof. Center roller 31 is offset with respect to frame roller 30 yet has its axis in the same line as the axis of the leading roller guide 28. Bearing in the overlapping portions of the third and fourth links of the carriage element is a frame roller 32. Similarly to frame roller 30, this roller is offset outwardly of axes of the leading roller and center roller. Rollers 33, 34 and 35 are displaced similarly on the trailing linkage portions of the carriage. These rollers are of diminished diameter with respect to the foregoing excepting the leading roller guide.

The respective linkage elements forming the carriage are joined to each other through master shafts which extend laterally across the instrument from one chain to the other. Master shaft 36 bears the frame roller 30. Likewise master shaft 37 bears the center roller 31, master shaft 38 bearing the frame roller 32. The trailing rollers 33, 34 and 35 bear on master shafts 39, 40 and 41, respectively. A plurality of panel rod engaging sleeves 42 are secured to each of the master shafts inwardly of the position occupied by linkage elements mounted on the respective shafts. Thus for each shaft, excepting leading roller guide 27, each of the shafts has a panel rod engaging sleeve spaced at slightly varying distances so that overlapping portions of the panel rod engaging sleeves do not meet on rotation thereof. It is preferred, though not essential, that the pitch diameter of each rod engaging sleeve correspond to that of rollers 30, 31 and 32. Such dimensions give rise to the provision for longitudinal grooves in rollers 30, 31 and 32 to accommodate panel rods. Rod engaging sleeves 42 have protrusions 43 which form a U-structure adapted to cover in partial engagement ends of the panel rod.

As best shown in Figure 5, several of the master shafts have external gears secured thereto for engaging the rack 19 and for engaging other similar gears. The gear arrangements, unlike the linkage arrangements on the carriage, are dissimilar and vary from side to side. An external gear 44 is journaled to master shaft 36 on the left side thereof and outwardly of the linkage element. This gear 44 engages a gear 45 which is journaled similarly on master shaft 37. Gear 45 directly engages the teeth of the rack 19. Master shaft 39 has journaled therein a gear 46, which gear engages the rack 19. Gear 47 is journaled to the left side of the master shaft 41, and this gear similarly to gear 45 engages the rack 19. Master shaft 38 secures gear 48 in its right extremity externally of the right linkage element. Likewise master shaft 39 has a gear 49 externally of the linkage structure. In addition, master shaft 40 is provided with a gear 50 at its right extremity. Gears 48, 49 and 50 mesh, gears 48 and 50 being idler gears deriving rotation from the shaft 39 securing driving gear 49. From a study of Figure 5, it will become obvious that movement of the carriage structure through actuation of chains 20 will not only impart collective movement of the entire carriage structure, but will also set in motion the master shafts forming a part of the carriage structure. By reason of the specific gear arrangement the shafts are adapted to rotate in alternately opposite directions to impart similar movement to the rod engaging elements 42 disposed at opposite portions of the shafts.

On the right extension of master shaft 39 is a cushioned roller 51 secured in rotatable engagement with the shaft. The roller 51 is adapted to actuate a trip mechanism hereinafter described. Preferably, this roller is positioned coaxially with gear 49.

For purposes of support there is provided a cross member 52 positioned axially of idlers which engage the chains on either side of the housing. The top cross member 52, unlike its counterpart at the lower extremity of the housing, is rigid and is adapted to provide support to a relatively circular support element 53. This portion of the device secures in depending relation the elements which are adapted to receive and deposit panels from registry in the moving carriage and against the inner frame structure of the device. A plate 54 is secured to the support 53 as by screw engagement. This plate 54 extends vertically downwardly and provides for securing the ramp and other elements associated therewith. A ramp 55 is secured to plate 54 so that the elements forming the ramp are displaced angularly with respect to the horizontal. The declination of the channel 56 in the ramp may be of any suitable degree, however, for all practical purposes declination of approximately 45° from horizontal is satisfactory. It will be seen that the channel 56 of the invention is adapted to receive the extensions of the rods which are used to support the panels and that upon insertion of the rods within the channel of the rack they will pass gravitationally from a point of introduction as at 57 downwardly to a point of deposit at the extremity of the declivity. A positioning member 58 is closely associated with the ramp 55 and likewise secured to plate 54 in movable relation thereto. The positioner 58 has a vertically projecting flange 59, the extremity of which defines a rod engaging cut-out 60. A cut-out 61 is formed in the flange to enable the movable engagement with the screw secured to the plate member 54. As is shown, the positioner may be bent angularly outwardly of the center of the instrument and downwardly to engage the plate 54 contiguous its inner surface. Engagement at this point is as at the previously mentioned cut-out portion, however, the aperture which is cut out forms an L-shape so that the positioner may be locked out of battery. A spring 62 may be secured to an inwardly directed flange portion 63 of the positioner.

A tandem trigger actuating mechanism 64 is keyed to a cross member 65, which cross member rests in the circular support 53 in arcuately movable relation thereto. Upon the right extension of the cross member 65, the trigger actuating mechanism 64 comprises a separator 66, a trip 67 directed vertically downwardly. Trip 67 has an inclined edge 68 positioned so as to face rearwardly of the device being placed in the path of the cushioned roller 51 for engagement therewith. Upon the upper extremity of this releasing mechanism there may be provided a flange for engaging a spring 69, which spring engages a stationary portion of plate 54.

Upon the opposite side of the separator a plate 70 extends vertically downwardly of the device to encompass the lower portion of the ramp and plate securing the ramp. Plate 70 projects vertically upwardly again as at 71 to form a depositing projection at its rearward extremity and a positioner trigger at its forward extremity, the positioning of the portions being determinate upon the positioning of other elements of the device with respect to the front and rear of the housing.

Suitable panels may be supported by panel engaging rods 72.

Figure 2:
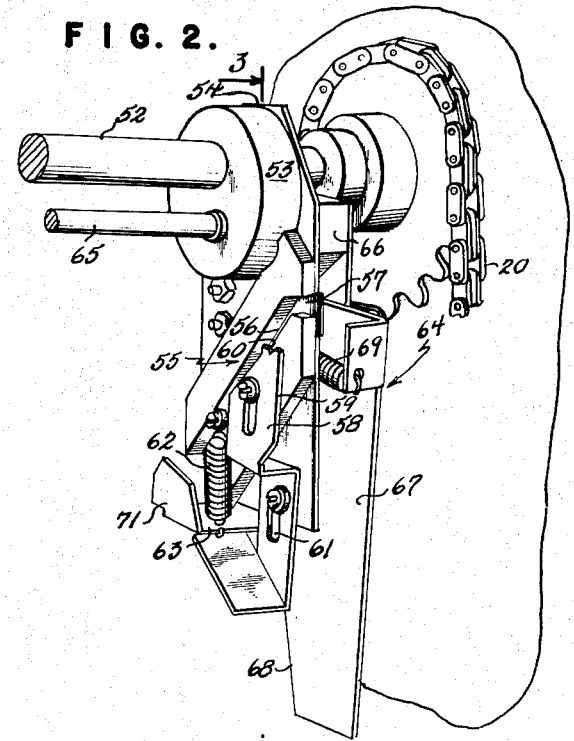
Figure 2 is a view in perspective of the depository and gathering elements of the invention which remain in relatively fixed position.
Figure 3:
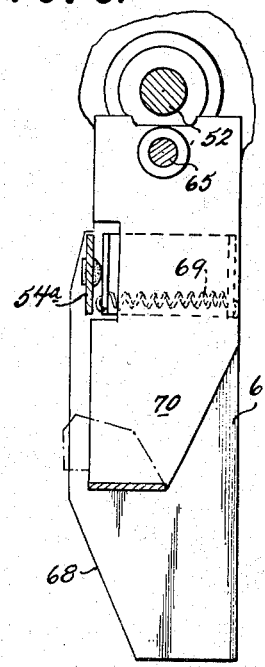
Figure 3 is a sectional view of the gathering and depository elements of the invention taken along the line 3—3 of Figure 2.
Figure 4:
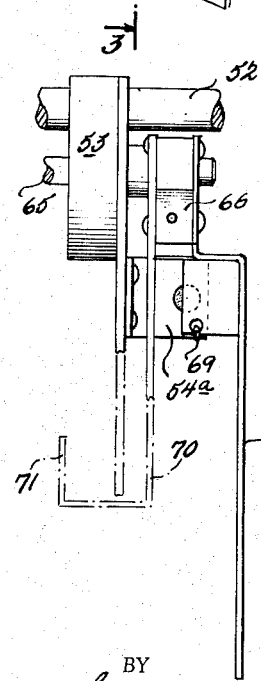
Figure 4 is a front view of the elements shown in Figure 2.

The tripping mechanism is adapted to effect the deposit of panel engaging rods from the ramp. The trip mechanism further serves to effect placing the positioner into battery thereby to retain at least one of the panel holding rods and panels in registry at the top portion 57 of the ramp. The counterpart of the trip means 64 shown in Figure 2 is displaced similarly with respect to the working elements of the device on the left side thereof, the only distinction between the counterpart and trip means 64 being the lack of a roller engaging plate such as shown in Figure 2. There is a counterpart for the gathering and depository means shown in Figure 2. This counterpart is positioned on the left portion of the device inwardly of rack 19. See Figure 5.

As shown in Figure 1, a plate 73 is positioned in bearing relation to the drive shaft, the plate extending substantially panel width along the base of the device inwardly of the arc formed by the driving means. This protector plate 73 serves to prevent fouling of the depending panels with the carriage upon operation of the device.

Operatively, the functions of displaying a number of indicia bearing panels simultaneously and concurrently are relatively simply accomplished. A plurality of panels which are borne upon rods may be inserted within the device for purposes of display. Extremities of rods carrying the panels are inserted into ramps such as have been described, the registry means on the opposed ramps being temporarily placed out of battery to allow passage of the rods along the ramp channel. A plurality of the panel rods gravitationally move to gathering position upon the lower end of the ramps. At least one panel rod may be positioned at the top portion of the ramps. The extensions of the rod are subsequently engaged by corresponding retaining extensions of the registry means, the registry means having been brought into battery through manual tripping thereof.

Preferably an indicia bearing panel should be placed in registry, contiguous the inner screen surface of the inner panel. Thus a rod supporting a panel may have its extremities thrust into the supporting recess of the inner frame structure, the engaging retainer being thrust out of battery and again into battery upon placement of the rod to secure the same into registry. This step is not necessarily essential to prepare the device for operation, however for initial display purposes it is required.

In order that the device may be placed in final condition for performance, it may be advisable to place the outer frame structure onto the device. This outer frame structure may be secured to vertical flanges extending outwardly of the sides of the inner frame.

Upon actuation of a motor, the carriage is moved in a clockwise direction with respect to axis of the driving means. Assuming that the initial point of starting of the instrument were to be at the base of the device, the carriage would travel upwardly adjacent the rear of the housing, the carriage being mounted in the endless chains which define a path throughout the housing. Carriage roller extensions ride in guide channels formed in sides of the housing. At this stage of movement the carriage structure would not engage any of the panels either in transfer, gathering or paying out relationship. As the carriage is moved upwardly, however, the first carriage portion to engage other working surfaces of the device is the trip engaging roller which is displaced on the right. The vertical travel of the carriage will effect tripping of the mechanism, thereby causing release to the rearwardmost stationed panel rod to enable the same to be effectively grasped by the carriage structure as it passes point of gathering which has been defined.

A study of the drawings, and particularly Figure 7, shows that as the trailing roller passes the point of deposit in the ramp structure, the transfer elements will engage rod extensions at either end and pass the same in a counterclockwise direction, the rod being guided by the guide adjacent to the said transfer means. The transfer means which is disposed on each of the master shafts is adapted to rotate at an opposed direction with respect to the transfer means of adjacent shafts. Transfer from one of the master shaft rollers to another is effected at the point of contiguous association of the guide elements one with the other. For instance, as the transfer elements rotate in adjacent relation, a rod is moved from the first gathering portion of the carriage to the second and alternately thereafter transferred in the same manner from the trailing portion of the carriage to the leading portion thereof.

As the carriage is moved further along its course of travel, and as the panel rod which has been gathered is transferred from the trailing portion to the leading portion of the carriage, the carriage moves about the arc defined in the uppermost portion of the device. The arc is defined about the ramp and ramp registry by the idler wheels shown in the drawings.

Having reached a preselected position in its travel, the device is adapted to transfer the panel which was placed in registry upon the inner frame structure from its point of registry thereon to a point of registry upon the rearward retaining portion such as is associated with the ramp structure. A panel previously registered on the ramp is ejected from registry by forceful deposit. As the panel which was previously placed in registry on the inner frame is moved from its position of initial registry to a secondary position of registry, this movement effects the displacement of the panel which has previously been placed in registry in the secondary position. Thus the panel rod removed from registry on the inner frame and passed into position of registry on the secondary registry means forcefully displaces the panel rod previously positioned in the secondary registry means forcing the same to fall downwardly of the ramp into position for gathering at the lower portion of the said ramp.

Simultaneously with this action, the carriage structure deposits the panel, which was obtained from the rearwardmost point of the ramp to the registry means defined on the inner frame. From this point downwardly the carriage disposes increments of the most recently placed outer panel along the inner surface of the screen. The increments of the panel which is now secured to the inner registry means are gathered concurrently with the paying out of the increments of the aforementioned panel. This concurrent gathering and paying out effects the appearance of elision of the various panels into one another. Thus it appears that the panel which has been placed in registry on the inner frame has its increments eliding into the decreasing increments of the other panel. As the carriage completes its course downwardly along the front portion of the device, the increasing portions of increments of the panel placed on the inner frame completely obliterate the decreasing increments of the latter panel until the screen shows only the single panel recently placed.

Access to the device may be obtained by lifting the detents and removing the combined inner and outer frames. For all practical purposes it is well to have the rearward portion of the housing so that access to rearward interior working elements of the device may be obtained with little difficulty.

Whereas the invention has been described in preferred form, it is to be noted that various alterations may be made without departing from the spirit of the invention. The present invention is, therefore, to be considered limited only as defined in the appended claims.

I claim:

1. In a display device for the successive display of at least two independent flexible panels in a stationary position, the improvement comprising a housing, a frame in the housing defining a display area, a plurality of individual flexible panels which are removably disposed within the housing, panel registry means on the frame for suspending one panel in display position, panel storage means in the housing adjacent the panel registry means, a panel carriage movably mounted in the housing upon a chain for endless travel within the housing and past the display area of the frame, at least one endless chain within the housing movably engaging a driving means and securing the carriage for movement about the housing, a panel removing means on the carriage for removing a first panel from the registry means and depositing said first panel upon the storage means, a panel transfer means on the carriage for removing a second panel from the storage means and suspending said second panel on the registry means, counter-rotating rollers on the carriage, a first of the rollers being disposed to pay out and expose increments of the first panel simultaneously as it is removed from the frame registry means and deposited upon the storage means and a second of the rollers being disposed to gather and expose increments of the second panel simultaneously as it is suspended on the registry means and as the carriage moves past the display area, driving means for the chain and guide means in the housing defining a path for the carriage, extensions on the carriage engaging the guide means, a rack adjacent the guide means and gear means on the carriage engaging the rack to rotate the panel removing and transfer means and the counter-rotating rollers.

2. The device of claim 1 in which the rate of movement of the periphery of the rollers and the movement of the carriage are the same.

3. In a device for the successive display of at least two independent flexible panels, a housing and a frame member within the housing, a plurality of flexible panels interchangeably disposed within the housing, supporting rods secured to an edge of the panels, a carriage for the panels movably mounted for endless travel within the housing, said carriage comprising a series of counter-rotating rollers, panel rod engaging sleeves axially connected to the rollers for rotation therewith, said rod engaging sleeves being disposed to remove and deposit panels from a point of storage to a point of registry and to effect transfer of a panel rod from a trailing position to a leading position on the carriage whereby to thread panels over the counter-rotating rollers in a smooth, taut condition, panel registry means on the frame and panel storage means adjacent the registry means, endless linkage means joining ends of the carriage, drive means engaging the linkage means to move the carriage in an endless circuit within the housing and guide means within the housing defining a path for the carriage, a fixed rack adjacent the guide means, gear means on the carriage engaging the rack to drive the rollers and rod engaging sleeves of the carriage.

4. The device defined in claim 3 wherein the panel rod engaging sleeves are rotatable at a rate, as in feet per minute equal to the rate of travel of the carriage.

5. A display device in which at least two flexible panels may be displayed concurrently in complementary relation one to another, comprising a housing; a frame attached to the housing and defining a display area in said housing; a plurality of flexible, movable panels located within the housing; panel registry means secured to the frame at one end thereof, panel storage means located adjacent the registry means and secured to the housing, a movable panel positioner at one end of the storage means and a movable panel depositing projection at the other end of the panel storage means, an endless chain mounted in the housing, a panel carriage movably mounted upon the chain for endless travel within the housing and past the display area of the frame, a panel removing means on the carriage engageable with a panel for removing a first panel from the registry means and depositing said first panel upon the panel positioner of the storage means, a panel transfer means on the carriage engageable with a panel for removing a second panel from the panel depositing projection of the storage means and delivering to and suspending the second panel on the registry means, counter-rotating rollers on the carriage, a first of the rollers engageable with and disposed to pay out and expose increments of the first panel simultaneously as it is removed from the frame registry means and deposited upon the panel positioner of the storage means and a second of the rollers being engageable with and disposed to gather and expose increments of the second panel simultaneously as it is suspended on the registry means and as the carriage moves past the display area, driving means for the chain, guide means in the housing defining a path for the carriage, extensions on the carriage engaging the guide means, a rack adjacent the carriage guide means, and gear means on the carriage engaging the rack to rotate the panel removing and transfer means and the counter-rotating rollers.

References Cited in the file of this patent
UNITED STATES PATENTS

| Number | Name | Date |
| --- | --- | --- |
| 603,109 | Lotz | Apr. 26, 1898 |
| 1,038,149 | Kelley | Sept. 10, 1912 |
| 1,061,407 | Rudolph | May 13, 1913 |
| 1,213,272 | Sarver | Jan. 23, 1917 |
| 1,251,555 | Meese | Jan. 1, 1918 |
| 2,135,207 | Bramer | Nov. 1, 1938 |
| 2,195,249 | Hutchinson | Mar. 26, 1940 |
| 2,228,137 | Hutchinson | Jan. 7, 1941 |